(12) United States Patent
Kliger et al.

(10) Patent No.: US 8,238,227 B2
(45) Date of Patent: Aug. 7, 2012

(54) SYSTEMS AND METHODS FOR PROVIDING A MOCA IMPROVED PERFORMANCE FOR SHORT BURST PACKETS

(75) Inventors: Avraham Kliger, Ramat Gan (IL); Eliahu Shusterman, Kfar Saba (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 273 days.

(21) Appl. No.: 12/636,979

(22) Filed: Dec. 14, 2009

(65) Prior Publication Data

US 2010/0158022 A1    Jun. 24, 2010

Related U.S. Application Data

(60) Provisional application No. 61/140,054, filed on Dec. 22, 2008.

(51) Int. Cl.
*H04J 11/00* (2006.01)
(52) U.S. Cl. .................. 370/210; 370/480; 370/329
(58) Field of Classification Search .................. None
See application file for complete search history.

(56) References Cited

U.S. PATENT DOCUMENTS

| | | | |
|---|---|---|---|
| 3,836,888 A | 9/1974 | Boenke et al. |
| 4,413,229 A | 11/1983 | Grant |
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |

(Continued)

FOREIGN PATENT DOCUMENTS

EP    0 385695    9/1990

(Continued)

OTHER PUBLICATIONS

Ovadia S., "MoCA: Ubiquitous Multimedia Networking in the Home," Proceedings of the SPIE—The International Society for Optical Engineering SPIE—The Internaitonal Society for Optical Engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG00677600000167760C00000&idtype=cvips&prog=normal>, as in European Search Report.

(Continued)

*Primary Examiner* — Duc C Ho
(74) *Attorney, Agent, or Firm* — Weiss & Arons LLP

(57) ABSTRACT

Systems and methods for reducing the latency and for increasing throughput for MoCA devices that are connected via a coax network are provided. One method according to the invention includes, in a network having a plurality of network modules, each of the plurality of network modules being connected to a coax backbone, communicating over the coax backbone between the plurality of network modules. The method further includes a requesting the use of short burst messages. The method further includes responding to the requesting by constructing a short burst message with a single channel equalization section and reducing the number of bits per hertz in the transmission constellation. The resulting messages can be received with an acceptable error rate while making more efficient use of the MoCA network.

13 Claims, 3 Drawing Sheets

U.S. PATENT DOCUMENTS

| | | |
|---|---|---|
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,675,970 B2 | 3/2010 | Nemiroff et al. |
| 7,783,259 B2 | 8/2010 | Dessert et al. |
| 7,916,756 B2 | 3/2011 | Atsumi et al. |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leathurbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1* | 1/2004 | Zhu et al. ................ 370/208 |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037589 A1 | 2/2008 | Kliger |
| 2008/0080369 A1 | 4/2008 | Sumioka et al. |
| 2008/0089268 A1 | 4/2008 | Kinder et al. |
| 2008/0117919 A1 | 5/2008 | Kliger |
| 2008/0117929 A1 | 5/2008 | Kliger |
| 2008/0130779 A1 | 6/2008 | Levi |
| 2008/0178229 A1 | 7/2008 | Kliger |

| | | |
|---|---|---|
| 2008/0189431 A1 | 8/2008 | Hyslop et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0273591 A1 | 11/2008 | Brooks et al. |
| 2008/0279219 A1 | 11/2008 | Wu et al. |
| 2008/0298241 A1 | 12/2008 | Ohana |
| 2009/0010263 A1 | 1/2009 | Ma et al. |
| 2009/0063878 A1 | 3/2009 | Schmidt et al. |
| 2009/0092154 A1* | 4/2009 | Malik et al. ............ 370/480 |
| 2009/0122901 A1 | 5/2009 | Choi et al. |
| 2009/0165070 A1 | 6/2009 | McMullin |
| 2009/0217325 A1 | 8/2009 | Kliger |
| 2009/0254794 A1 | 10/2009 | Malik et al. |
| 2009/0257483 A1* | 10/2009 | French et al. ............ 375/230 |
| 2009/0279643 A1 | 11/2009 | Shusterman |
| 2009/0316589 A1 | 12/2009 | Shafeeu |
| 2010/0031297 A1 | 2/2010 | Klein |
| 2010/0080312 A1* | 4/2010 | Moffatt et al. ............ 375/260 |
| 2010/0150016 A1* | 6/2010 | Barr ............ 370/252 |
| 2010/0158013 A1 | 6/2010 | Kliger |
| 2010/0158015 A1 | 6/2010 | Wu |
| 2010/0158021 A1 | 6/2010 | Kliger |
| 2010/0174824 A1 | 7/2010 | Aloni et al. |
| 2010/0185731 A1 | 7/2010 | Wu |
| 2010/0238932 A1 | 9/2010 | Kliger |
| 2010/0246586 A1 | 9/2010 | Ohana |
| 2010/0254278 A1 | 10/2010 | Kliger |
| 2010/0254402 A1 | 10/2010 | Kliger |
| 2010/0281195 A1 | 11/2010 | Daniel et al. |
| 2010/0284474 A1 | 11/2010 | Kliger |
| 2010/0290461 A1 | 11/2010 | Kliger |
| 2011/0013633 A1 | 1/2011 | Klein |
| 2011/0080850 A1 | 4/2011 | Klein |
| 2011/0206042 A1 | 8/2011 | Tarrab et al. |
| 2011/0310907 A1 | 12/2011 | Klein |

FOREIGN PATENT DOCUMENTS

| | | |
|---|---|---|
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27253 dated Dec. 30, 2003 (4 pgs.).

International Search Report for International Application No. PCT/US03/27254 dated Feb. 3, 2004 (5 pgs.).

Multichannel Monk News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar 29, 2009.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

SYSTEMS AND METHODS FOR PROVIDING A MOCA IMPROVED PERFORMANCE FOR SHORT BURST PACKETS

CROSS-REFERENCED TO RELATED APPLICATIONS

This application claims priority from U.S. Provisional Patent Application No. 61/140,054, filed Dec. 22, 2008, entitled "MoCA 2.0 Short Preamble", which is hereby incorporated by reference in its entirety.

FIELD OF TECHNOLOGY

The present invention relates generally to information networks and specifically to transmitting information such as media information over communication lines such as coaxial cable (hereinafter "coax"), thereby to form a communications network.

BACKGROUND OF THE INVENTION

Network technologies using coax are generally known. The Multimedia over Coax Alliance (MoCA™), at its website mocalliance.org, provides an example of a suitable specification for networking of digital video and entertainment through existing coaxial cable in the home which has been distributed to an open membership. The MoCA 1.1 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms, master bedrooms and other locations. Home networking technology allows homeowners to utilize this infrastructure as a networking system and to deliver other entertainment and information programming with high Quality of Service (QoS).

The technology underlying home networking over coax provides high speed (270 mbps), high QoS, and the innate security of a shielded, wired connection combined with packet-level encryption. Coax may allow for the carrying of high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax works with access technologies, such as Asynchronous Digital Subscriber Line (ADSL) and Very high bit rate Digital Subscriber Line (VDSL) services or Fiber to the Home (FTTH), that typically enter the home on a twisted pair or on an optical fiber, operating in a frequency band from a few hundred kilohertz to 8.5 MHz for ADSL and 12 Mhz for VDSL. As services reach the home via unknown Digital Subscriber Line (xDSL) or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

It would be desirable to reduce latency and/or improve throughput with MoCA devices connected by a MoCA network.

SUMMARY OF THE INVENTION

A system and/or method for reducing latency with MoCA devices connected by a MoCA network with or without improving throughput in the network. The system and/or method may also improve the throughput of MoCA devices connected by a MoCA network with or without reducing latency in the network. The method or system may be implemented substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
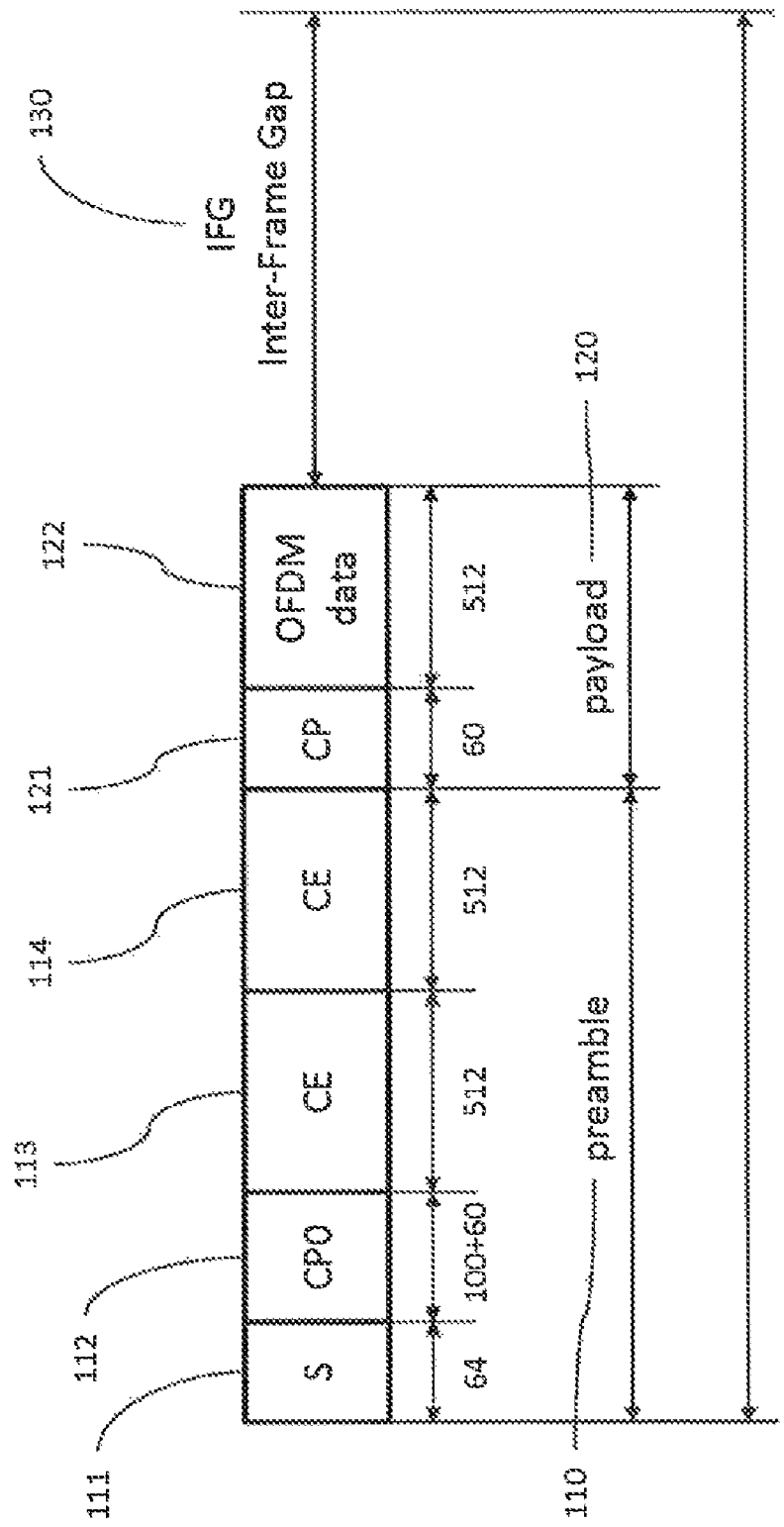
FIG. 1 shows a message with an typical preamble.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, wave guides, and/or wireless transmission media (e.g., air and/or space).

For ease of reference, the following glossary provides definitions for the various abbreviations and notations used in this patent application:

ACK TCP Acknowledge Signal message
ADSL Asynchronous Digital Subscriber Line
CE Channel Equalization
CP Cycle Prefix
EN MoCA Existing Node (the term "node" may be referred to alternatively herein as a "module")
FTTH Fiber To The Home
IFG Inter-Frame Gap
MAC Media Access Control
MAP Media Access Plan
NC MoCA Network Controller
OFDM Orthogonal Frequency Division Multiplexing
PHY Communications layer for the grouping of messages and transmission over the physical medium
RR Reservation Request Message
SC Sub-Carriers of the OFDM system
SNR Signal to Noise Ratio
STB Set Top Box
TCP Transmission Control Protocol
QoS Quality of Service
VDSL Very high bit rate Digital Subscriber Line
xDSL unknown Digital Subscriber Line The specification describes a method to achieve reduced latency and/or improved throughput with MoCA devices which have been modified according to the invention. The MoCA devices may be nodes on a MoCA network. The MoCA network may be constructed using a collection of coaxial cables to connect a plurality of network nodes. Each node in the network may be configured to request messages constructed according to the invention. There are many types of messages that can be used in the MoCA network.

Typical messages in the MoCA network include a payload section and a preamble section. The payload section includes data which is to be transferred via the network. The preamble section may include one or more symbols that the receiver may use to adjust one or more receiver parameters in a manner that may improve the reception of the message.

Some of the messages in a MoCA network are called short burst messages. These messages are so short that the overhead used to send the message, in particular the preamble of these messages, are overly burdensome and become a source of inefficiency in the MoCA network.

The MoCA network is an OFDM network that utilizes a number of constellations that are set forth in the MoCA specification. Each constellation may be interpreted as a matrix of "points." Each point may allow the transmission of a certain number of bits. All bits used in the MoCA specification are transmitted via these points. A MoCA device may include a receiver that interprets the points of the constellation, and adjusts its parameters according the channel adjustment symbols in the preamble. A MoCA device may also include a transmitter that responds to receiver requests.

The systems and/or methods of the invention may provide for the transmission and reception of reduced-size preambles for short burst messages. The systems and/or methods may reduce the preamble size while optionally changing the interpretation of the constellation used to modulate the signals in the MoCA network. The constellation may be reduced by reducing the number of bits interpreted from some or all of the points. The shortened preamble and if requested, the reduced constellation, may be sent/used when the receiver requests (i.e. indicates the ability to receive) the shortened preamble.

Nodes communicate using several types of message. Messages are constructed from OFDM symbols and typically begin with the preamble section. Every OFDM symbol may include a cyclic prefix that includes a specifically constructed bit pattern so that the orthogonality of channels in the OFDM constellation can be improved by the receiver. The preamble may be used for adjusting the receiver parameters that control bit reception accuracy.

Two CE symbols are typically included in the MoCA preamble. The CE symbol is another specifically designed group of bits. A receiver may use the reception of the a CE symbol to improve the accuracy filters that extract OFDM constellation bits. The typical preamble size scales with the number of SC in the OFDM system and can be a significant overhead burden particularly when the message payload is small.

Certain message types belong to the category of short burst messages e.g., RR, ACK etc. Short burst messages are less than 200 bytes (2000 bits) in length (including overhead) while excluding the MAC overhead. The MoCA network uses OFDM symbols to transmit collections of bits. Each OFDM symbol includes approximately 4000 bits.

FIG. 1 shows a typical short burst message 100 using a typical preamble 110. The short burst message 100 includes a typical preamble 110 and a payload section 120. The typical preamble 110 includes an optional short series section 111 designated by "S", a larger cycle prefix section 112 designated by "CP0", a first CE section 113 and a second CE section 114 each designated by "CE." The CP0 is the cyclic prefix for the first CE symbol. The second CE symbol does not have a CP. The optional short series section has a typical length of 64 samples but may be larger or smaller size. The larger cycle prefix section has a length of 160 samples and each CE section has a length of 512 samples producing a total length for the typical preamble of between 1184-1248 samples.

The payload section 120 includes a cycle prefix section 121 and an OFDM data section 122 which together form one OFDM symbol. The CP section has a length of 60 samples and the OFDM data section 122 has a length of 512 samples producing a total length for the payload section 120 of 572 samples. The length of a complete short burst message including the typical preamble 110 is between 1756-1820 samples, which in sum are less than 50% of the capacity of an ordinary OFDM symbol used by the MoCA network. The typical short burst message 100 contains three OFDM symbols without the optional short series section 111.

Figure 2:
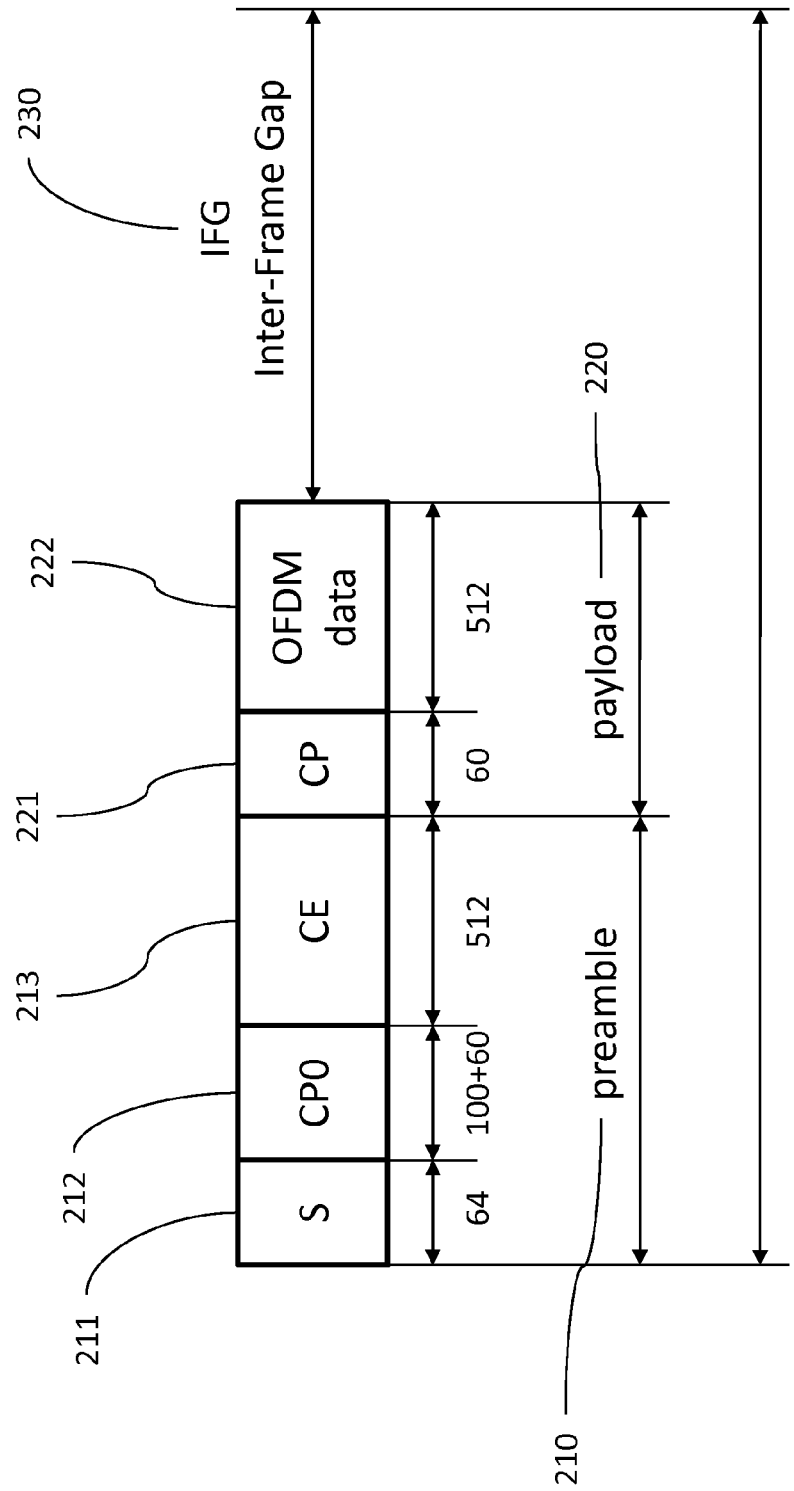
FIG. 2 shows a message with a short burst preamble according to the invention.

FIG. 2 shows a short burst message 200 using an embodiment of a short preamble 210 according to the principles of the invention. The short burst message 200 includes a short preamble 210 and a payload section 220. The short preamble 210 includes an optional short series preamble section 211 designated by "S", a larger cyclic prefix section 212 designated by "CP0" and a CE section 213 designated by "CE." The CP0 is the cyclic prefix for the for CE symbol The optional short series section has a typical length of 64 samples but may be larger or smaller size. The larger cycle prefix section has a length of 160 samples and the CE section has a length of about 512 samples producing an approximate length for the short preamble 210 varying between 672-736 samples.

The payload section 220 includes a CP section 221 and an OFDM data section 222. The CP section has a length of about 60 samples and the OFDM data section 222 has a length of about 512 samples producing an approximate length for the payload section 220 of 572 samples. The approximate length of the complete short burst message 200 including a short preamble 210 according to the invention varies between 1244-1308 samples which are less than 50% of the capacity of the ordinary OFDM symbol used by the MoCA network. The short burst message 200 contains two OFDM symbols without the optional short series section 111, thus improving the bandwidth utilization of short burst messages.

The use of a single CE section 213 included in the short preamble 210 instead of the two CE sections 113, 114 included in the typical preamble 110 reduces the quality of the received signal to noise ratio in the MoCA network. The shorter bit sequence, of the single CE symbol, results in a less accurate adjustment channel estimation. When a receiver chooses to receive a short preamble 210 it may be desirable to compensate for the loss of channel equalization. Therefore, the receiver may also request the use of a reduced constellation when the short preamble 210 is requested. The reduced constellation reduces the number of bits per hertz at some or all of the points in the constellation. The reduction bits may achieve an improvement in the noise margin of up to 6 dB in signal to noise ratio (SNR) for the transmission of a short burst message. This improved SNR margin may compensate for the missing CE section in the short preamble 210.

The reduction of bits per hertz in the constellation reduces the number bits in an exemplary OFDM symbol to about 3000 bits. Since an exemplary short burst message is less than 2000 bits in length the reduction in the number of available bits does not reduce the efficiency of the transmission.

Figure 3:
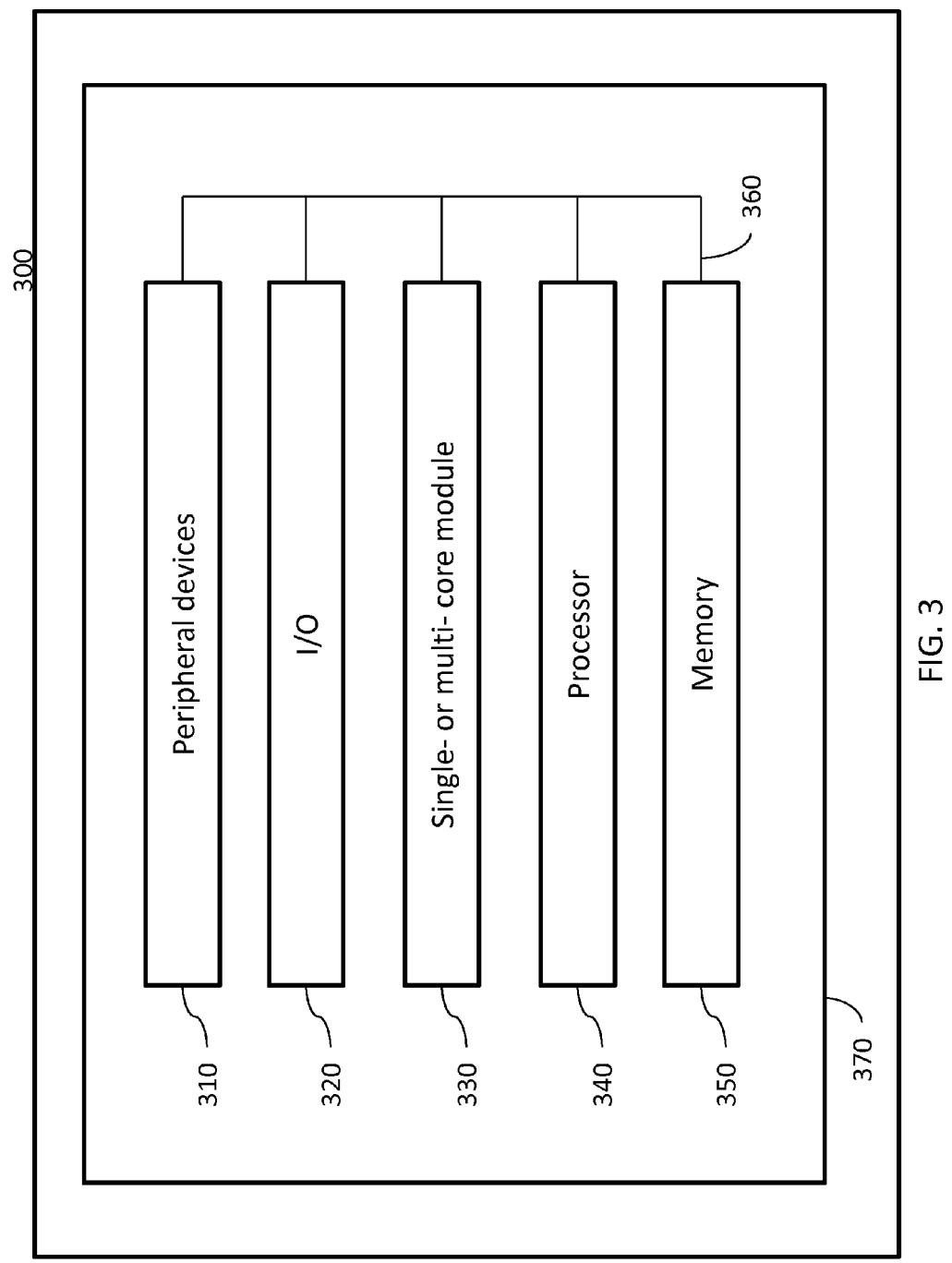
FIG. 3 shows a chip module according to the invention.

FIG. 3 shows a single or multi-core module 330 according to the invention, which can be one or more integrated circuits, in an illustrative data processing system 300 according to the invention. Data processing system 300 may include one or more of the following components: I/O circuitry 320, peripheral devices 310, processor 340 and memory 350. These components may be coupled together by a system bus or other interconnections 360 and are disposed on a circuit board 370 in an end-user system that may be in communication with a coax medium via an interface.

Thus, systems and methods for providing a MoCA short burst preamble have been described.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A network over coaxial cable, the network comprising a node that is configurable to request a message comprising a short burst preamble:
   the networked node comprising a receiver which is configurable to request a message containing the short burst preamble; and
   the preamble comprising a single channel estimation section.

2. The network of claim 1 wherein the message is a reservation request message.

3. The network of claim 1 wherein the message is an ACK message.

4. The network of claim 1 wherein the node is configured to request the utilization of a reduced constellation while transmitting the message.

5. A method for communicating over a network, the network comprising a plurality of network modules, the method comprising:
   requesting reception of a short burst message comprising a short preamble;
   transmitting the short burst message; and
   receiving the short burst message.

6. The method of claim 5 wherein the preamble contains a single channel estimation section.

7. The method of claim 5 wherein the message is a reservation request message.

8. The method of claim 5 wherein the message is an ACK message.

9. The method of claim 5 wherein the node requests the transmitting of the short burst message wherein the transmission utilizes a reduced constellation.

10. A network over coaxial cable, the network comprising a node that is configurable to transmit a message comprising a short burst preamble; wherein:
    the networked node comprises a transmitter which is configurable to transmit a message containing a short burst preamble; and
    the preamble comprises a single channel estimation section.

11. The network of claim 10 wherein the message is a reservation request message.

12. The network of claim 10 wherein the message is an ACK message.

13. The network of claim 10 wherein the node utilizes a reduced constellation while transmitting the message.

* * * * *